United States Patent [19]

Locker

[11] 4,124,341
[45] Nov. 7, 1978

[54] APPARATUS FOR COOLING AND GRANULATING STRANDS OF THERMOPLASTIC MATERIAL

[75] Inventor: Peter Locker, Goldbach, Germany

[73] Assignee: Automatik Apparate-Maschinenbau H. Hench Gesellschaft mit beschraenkter Haftung, Grossostheim, Germany

[21] Appl. No.: 803,687

[22] Filed: Jun. 6, 1977

[30] Foreign Application Priority Data

Jun. 18, 1976 [DE] Fed. Rep. of Germany ....... 2627263

[51] Int. Cl.² .................................................. B29F 3/00
[52] U.S. Cl. .................................... 425/136; 425/154; 425/294
[58] Field of Search ............... 425/136, 154, 337, 308, 425/294

[56] References Cited

U.S. PATENT DOCUMENTS 2,349,829  5/1944  Nydegger et al. ................... 425/136
2,626,423  1/1953  Collins ................................ 425/136

FOREIGN PATENT DOCUMENTS 2,218,210  1972  Fed. Rep. of Germany.

*Primary Examiner*—Richard B. Lazarus
*Attorney, Agent, or Firm*—Wolfgang G. Fasse; Willard W. Roberts

[57] ABSTRACT

An apparatus is provided for cooling and granulating strands of thermoplastic material. The apparatus has a chute located below nozzles for producing the strands, a cooling water inlet for supplying cooling water to the chute, a safety gate forming the lower end of the chute and positioned to receive the strands from the chute and pivotable away from the strands, a pair of draw-in feed advance rollers arranged downstream of the pivotal gate and a cutting roller arranged downstream of the draw-in rollers. A sensor is actuable by the pivotal movement of the safety gate to stop the draw-in rollers and the cutting roller in response to tilting of the gate.

6 Claims, 1 Drawing Figure

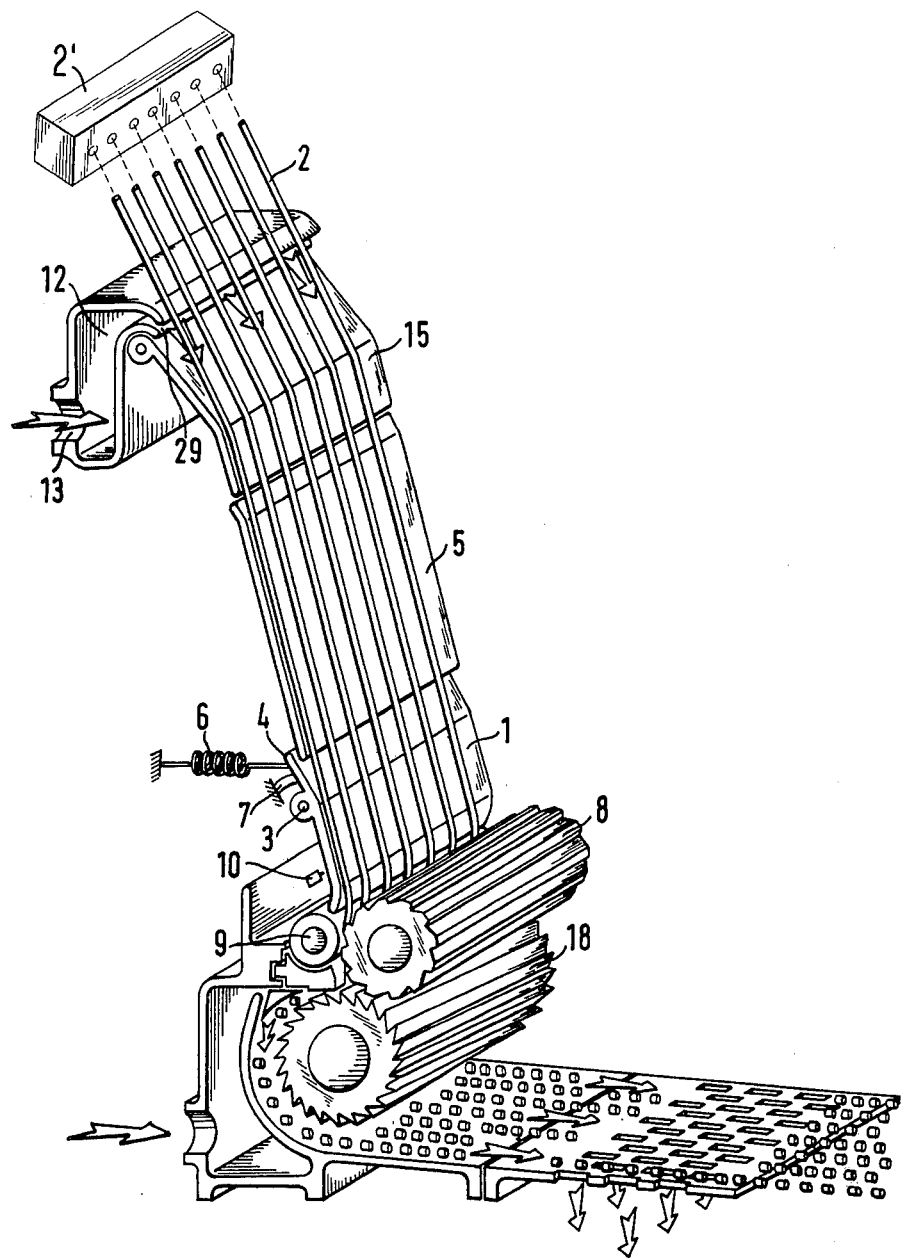

APPARATUS FOR COOLING AND GRANULATING STRANDS OF THERMOPLASTIC MATERIAL

FIELD OF THE INVENTION

The invention relates to an apparatus for cooling and granulating strands of thermoplastic materials, the apparatus having strand guide chute or channel, the upper end of which is provided with a cooling water inlet and is arranged beneath nozzles for extruding the molten strands and the lower end of which leads to a pair of draw-in rollers arranged upstream of a cutting roller.

BACKGROUND OF THE INVENTION

An apparatus of this type is known from German Offenlegungsschrift No. 2,218,210, corresponding to British Pat. No. 1,390,614.

An object of the invention is to provide an apparatus whose operation can be readily stopped in the event of a fault which prevents the strands from being drawn into the draw-in or feed advance rollers and thus causes strands to accumulate upstream of the pair of draw-in rollers. This is desirable in order to prevent the draw-in rollers and the cutting roller from being damaged by the tangled accumulation of strands. The prevention of damage to the rollers is desirable because the rollers, especially the cutting roller, are expensive since they are made of hardened steel. In addition, the rollers are precisely spaced and supported in bearings which must be precision bearings to maintain the precise spacing. Once the rollers are stopped, additional back-up of the strands is prevented by stopping the further extrusion and the stopped rollers prevent the forcing of piled up or balled up strands into the gap between the rollers.

SUMMARY OF THE INVENTION

According to the invention there is provided an apparatus for cooling and granulating strands of thermoplastic material, comprising a chute or channel located below nozzles for producing the strands, a cooling water inlet for supplying cooling water to the channel, a flap or gate section of the chute is positioned to receive the strands from the channel and pivotable away from the strands, a pair of draw-in rollers arranged downstream of the pivotal flap or gate, a cutting roller arranged downstream of the draw-in rollers, and a sensor actuable by the pivotal movement of the flap or gate to cause the stopping of the draw-in rollers and the cutting roller.

In normal operation, the safety flap or gate forms part of the chute along which the strands pass to the nip between the draw-in rollers. If, however, there is any obstruction which causes the strands to accumulate in front of the draw-in rollers and to pile up like a ball, the end of the safety flap opposite the pair of draw-in rollers is pressed away by the strands so that this end is removed from the strands. As this end pivots, it actuates the sensor which disconnects the drive to the pair of draw-in rollers and the cutting roller. When the drive is disconnected, the ball formed by the accumulation of strands upstream of the pair of draw-in rollers may be removed without endangering the operator and or the cutting and draw-in rollers.

The safety flap is preferably mounted to pivot about an axis running transversely to the strands and lying in the region of its upper end. In this case, there is only a relatively slight pivotal movement at its upper end while the lower end of the safety flap executes a layer movement which may be utilised for actuating the signal transmitter. To allow the water flowing out through the channel to be reliably channelled further by the safety flap, the latter is preferably arranged in such a way that its upper end engages behind the channel. In this way, the water is led out via the channel and the safety flap without being able to leak away via the upper end of the safety flap.

BRIEF DESCRIPTION OF THE DRAWING

The single FIGURE is a perspective view of an embodiment of the invention.

DETAILED DESCRIPTION OF PREFERRED EMBODIMENT

Strands 2 leave the nozzles 2' and are fed to an outlet channel or chute 5 via an inlet flap or gate 15. Cooling water is supplied from a water tank 12 to the upper end of the inlet flap 15 (as indicated by the arrows). Water is supplied to the water tank through an inlet 13 so that the water level in the water tank 12 rises until the water overflows through an outlet 29 which acts as a weir. The water thus reaches the inlet flap 15 and the outlet channel 5 uniformly, so that the strands are cooled in the desired manner and solidify.

The lower end of the outlet channel 15 leads to a safety flap or gate 1 which is pivoted about an axis 3. The axis 3 is located in the region of the upper end of the safety flap 1 and extends transversely with respect to the strands. The upper end 4 of the safety flap 1 is attached to a tension spring 6 which pulls the safety flap 1 against a stop 7. A limit switch 10 is arranged behind the safety flap 1 in the area of the lower end thereof. The switch 10 is actuatable by pivotal movement of the safety flap 1 to cause a signal to be transmitted to stop the draw-in rollers 8 and 9 and a cutting roller 18.

The safety flap or gate 1 is caused to pivot if an accumulation of strands forms upstream of the rollers 8 and 9. Such an accumulation may be caused, for example, by irregularities in the strands 2. The accumulation of strands presses against the lower end of the safety flap 1 and forces the safety flap to pivot backwards about the axis 3 against the force of the spring 6. The safety flap 1 eventually contacts the limit switch 10 which is thus actuated and renders the draw-in rollers 8 and 9 and the cutting roller 18 inoperative. The accumulation of strands can then be removed without danger to the operator.

The above mentioned objective is accomplished by the invention by the tiltable gate or flap 1 which is hinged along the hinging axis 3 and which is normally held against the stop 7 by the biasing spring 6. Only when the weight of balled up strands on the lower end of the gate exceeds the biasing force of the spring 6, will the gate be tilted in the clockwise direction around the hinging axis 3 to engage the limit switch 10 which in turn will stop the drive of the rollers 8, 9, and 18 and the further extrusion.

As illustrated, the upper end 4 of the safety flap 1 engages behind the lower end or edge of the outlet channel 5 so that all water flowing through the outlet channel 5 is fed to the safety flap or gate 1.

I claim:

1. An apparatus for handling strands of thermoplastic material, comprising nozzle means for extruding said strands, strand handling means spaced below said nozzle means, chute means operatively interposed between said nozzle means and said strand handling means for guiding the strands from said nozzle means to said strand handling means, said chute means comprising a lower edge and a gate section located at said lower edge adjacent to said strand handling means, hinge means holding said gate section in a tiltable position, and switching sensor means located to respond to a tilting movement of said gate section for stopping the operation of said strand handling means and of said nozzle means thereby preventing damage to the strand handling means.

2. The apparatus of claim 1, wherein said gate section comprises an upper edge located behind said lower edge of said chute means, whereby said lower edge of said chute means acts as a stop for the tilting movement of said gate section.

3. The apparatus of claim 2, further comprising stop means located adjacent said upper edge of said gate section and spring means normally biasing said upper edge against said stop means.

4. The apparatus of claim 1, wherein said gate section is so positioned that tilting of the gate section away from said strands actuates said switching sensor means.

5. The apparatus of claim 1, wherein said strand handling means comprise strand feed advance roller means and strand cutting roller means, the operation of which is stopped by said switching sensor means in response to jamming up of said strands just above said feed advance roller means, whereby said gate section is tilted away from said strands toward said switching sensor means.

6. The apparatus of claim 1, further comprising cooling liquid supply means arranged at the upper end of said chute means, said cooling liquid supply means having an outlet edge extending along the entire width of said chute means.

* * * * *